US008831758B1

(12) United States Patent
Chu et al.

(10) Patent No.: US 8,831,758 B1
(45) Date of Patent: Sep. 9, 2014

(54) INTERFACE-BASED GAME-SPACE CONTEST GENERATION

(71) Applicant: Kabam, Inc., San Francisco, CA (US)

(72) Inventors: Yuexin Chu, San Francisco, CA (US);
Alex Genco, San Francisco, CA (US);
Jason Lee, San Francisco, CA (US);
Clive Henrick, Castro Valley, CA (US);
Matthew Curtis, Novato, CA (US);
Kellen Christopher Smalley, Dublin, CA (US); Michael C. Caldarone, Palo Alto, CA (US)

(73) Assignee: Kabam, Inc., San Francisco, CA (US)

( * ) Notice: Subject to any disclaimer, the term of this patent is extended or adjusted under 35 U.S.C. 154(b) by 0 days.

(21) Appl. No.: 13/847,981

(22) Filed: Mar. 20, 2013

(51) Int. Cl.
*A63F 13/00* (2014.01)
*G06F 19/00* (2011.01)
*A63F 13/12* (2006.01)

(52) U.S. Cl.
CPC .................................... *A63F 13/12* (2013.01)
USPC ......... 700/91; 463/9; 463/25; 463/31; 700/92

(58) Field of Classification Search
USPC ................................ 463/25, 31, 9; 700/91–92
See application file for complete search history.

(56) References Cited

U.S. PATENT DOCUMENTS

| | | | | |
|---|---|---|---|---|
| 5,816,918 A * | 10/1998 | Kelly et al. | ...................... | 463/16 |
| 8,147,340 B2 * | 4/2012 | Brunet de Courssou et al. | .............................. | 463/42 |
| 8,231,453 B2 * | 7/2012 | Wolf et al. | ...................... | 463/20 |
| 8,231,470 B2 * | 7/2012 | Feeney et al. | .................. | 463/42 |
| 8,323,110 B2 * | 12/2012 | Shibamiya et al. | ............. | 463/42 |
| 8,360,868 B2 * | 1/2013 | Shvili | ............................. | 463/27 |
| 8,475,262 B2 * | 7/2013 | Wolf et al. | ...................... | 463/20 |
| 2002/0119824 A1 * | 8/2002 | Allen | ............................. | 463/42 |
| 2003/0190960 A1 * | 10/2003 | Jokipii et al. | .................. | 463/42 |
| 2006/0287102 A1 * | 12/2006 | White et al. | .................... | 463/42 |
| 2007/0191101 A1 * | 8/2007 | Coliz et al. | ...................... | 463/42 |
| 2007/0191102 A1 * | 8/2007 | Coliz et al. | ...................... | 463/42 |
| 2007/0213116 A1 * | 9/2007 | Crawford et al. | ............... | 463/16 |
| 2008/0200260 A1 | 8/2008 | Deng | .............................. | 463/42 |
| 2010/0099471 A1 * | 4/2010 | Feeney et al. | ..................... | 463/1 |
| 2010/0113162 A1 | 5/2010 | Vemuri et al. | .................. | 463/42 |
| 2010/0210356 A1 | 8/2010 | Losica | ............................ | 463/26 |
| 2011/0281654 A1 * | 11/2011 | Kelly et al. | ..................... | 463/42 |
| 2011/0319170 A1 | 12/2011 | Shimura et al. | ................. | 463/42 |
| 2012/0083909 A1 | 4/2012 | Carpenter et al. | ............. | 700/92 |
| 2012/0156668 A1 | 6/2012 | Zelin | ............................. | 434/362 |
| 2012/0166449 A1 * | 6/2012 | Pitaliya | ........................ | 707/748 |
| 2012/0244947 A1 * | 9/2012 | Ehrlich | .......................... | 463/42 |
| 2013/0090750 A1 * | 4/2013 | Herrman et al. | ................ | 700/92 |

* cited by examiner

*Primary Examiner* — William H McCulloch, Jr.
(74) *Attorney, Agent, or Firm* — Pillsbury Winthrop Shaw Pittman LLP

(57) ABSTRACT

An approach to facilitating interface-based game-space contest generation is provided. A user interface may be provided to an administrator. The user interface may be configured to receive user inputs from the administrator that include one or more performance criteria to be associated with a contest to be provided in a game space, one or more awards to be distributed in association with the contest, and one or more qualifications to participate in the contest. A notification that relates to the contest may be provided, based on the user inputs, in the game space. Performance scores of users that participated in the contest may be determined based on the performance criteria and activities that are performed in the game space by the participating users. Automated distribution of the awards to individual ones of the participating users may be facilitated in accordance with the performance scores of the individual participating users.

20 Claims, 4 Drawing Sheets

US 8,831,758 B1

INTERFACE-BASED GAME-SPACE CONTEST GENERATION

FIELD OF THE DISCLOSURE

This disclosure relates generally to interface-based game-space contest generation.

BACKGROUND

Traditionally, configuration of a contest is performed by engineers to manually code changes to the backend to execute the contest. Typically, at the end of a contest, administrators manually judge the performance of participating users of the contest, for instance, by evaluating contest activities performed by those users, by comparing scores computed for those users, etc. In addition, the administrators often manually distribute the contest awards based on their judging. Among other issues, these conventional techniques may be associated with human-related errors (e.g., judging errors, awarding errors, etc.) along with delays in award distribution, resulting in user dissatisfaction with the contest experience, higher volume of support calls, and/or other drawbacks.

SUMMARY

One aspect of the disclosure relates to a system configured to facilitate interface-based game-space contest generation, in accordance with one or more implementations. In exemplary implementations, one or more performance criteria to be associated with a contest to be provided in a game space, one or more awards to be distributed in association with the contest, one or more qualifications to participate in the contest, and/or other contest-related user inputs may be received via a user interface. Based on these user inputs, a notification that relates to the contest may be provided in the game space. Contest-related activities that are performed in the game space by the users participating in the contest may be monitored. Performance scores of the participating users may be determined based on the performance criteria and the performed activities. The awards may be automatically distributed to individual ones of the participating users in accordance with the performance scores of the individual participating users. In this way, interface-based game-space contest generation may decrease human-related errors (e.g., by providing more accurate performance scoring of performed contest-related activities, awarding the right participating users, etc.), reduce award distribution delays (e.g., by determining the award winners more quickly, distributing the awards upon such determination, etc.), improve user experience relating to such contests, lower the number of support calls, and/or provide other benefits.

In some implementations, the system may include one or more servers. The server(s) may be configured to communicate with one or more client computing platforms according to a client/server architecture. The users may access the system via the client computing platforms, for instance, to interact with one or more services.

The server(s) may be configured to execute one or more computer program modules to facilitate interface-based game-space contest generation. The computer program modules may include one or more of a template interface module, a contest implementation module, a performance determination module, an award distribution module, and/or other modules. In some implementations, the client computing platforms may be configured to execute one or more computer program modules that are the same as or similar to the computer program modules of the server(s) to facilitate interface-based game-space contest generation.

The template interface module may be configured to provide a user interface configured to receive user inputs that include one or more performance criteria to be associated with a contest to be provided in a game space, one or more awards to be distributed in association with the contest, one or more qualifications to participate in the contest, and/or other user inputs. The template interface module may be configured to provide the user interface to an administrator to receive the user inputs from the administrator via the user interface. The game space may be configured to facilitate interaction of users with the game space and/or each other by performing operations in the game space in response to commands received from the users.

In certain implementations, the performance criteria may relate to success with respect to the contest to be provided in the game space. The success-related performance criteria may relate to one or more of resource collection, building possession, combat, rescues, or level progress.

In some implementations, the qualifications to participate in the contest may include merit-based qualifications associated with the game space. The merit-based qualifications may relate to one or more of possessed structures, collected resources, combat history, rescue history, or user level.

The contest implementation module may be configured to provide, based on the user inputs, a notification in the game space that relates to the contest. For example, the notification may be provided based on the performance criteria to be associated with the contest, the awards to be distributed in association with the content, and/or the qualifications to participate in the contest that are received as one or more of the user inputs. In various implementations, for instance, the notification may indicate one or more of the users that are qualified to enter the contest based on the qualifications to participate in the contest. In some implementations, the notification may indicate the performance criteria, the awards, and/or the qualifications.

In certain implementations, the contest implementation module may execute the contest in the game space based on the user inputs. The performance determination module may be configured to determine, based on the performance criteria and activities that are performed in the game space by the users that participated in the contest, performance scores of the participating users. The award distribution module may be configured to facilitate automated distribution of the awards to individual ones of the participating users in accordance with the performance scores of the individual participating users.

In various implementations, the award distribution module may be configured such that at least one of the awards is distributed to at least one of the participating users in response to the performance scores of the at least one participating user satisfying one or more performance thresholds.

In certain implementations, the award distribution module may be configured such that the awards are distributed based on one or more predetermined intervals of the contest. In some implementations, the award distribution module may be configured such that a first award of the awards is distributed during a first predetermined interval of the predetermined intervals to a first participating user of the participating users in response to the performance scores of the first participating user satisfying a first performance threshold during the first predetermined interval, and such that a second award of the awards is distributed during a second predetermined interval of the predetermined intervals to the first participating user in response to the performance scores of the first participating user satisfying a second performance threshold during the second predetermined interval.

In certain implementations, the template interface module may be configured to store a template that indicates the user inputs. As such, in some implementations, the contest may be executed in the game space based on the stored template. The contest may, for instance, be executed based on a predetermined schedule, a periodic basis, a manual user activation, and/or other trigger using the user inputs indicated in the stored template.

These and other features, and characteristics of the present invention, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
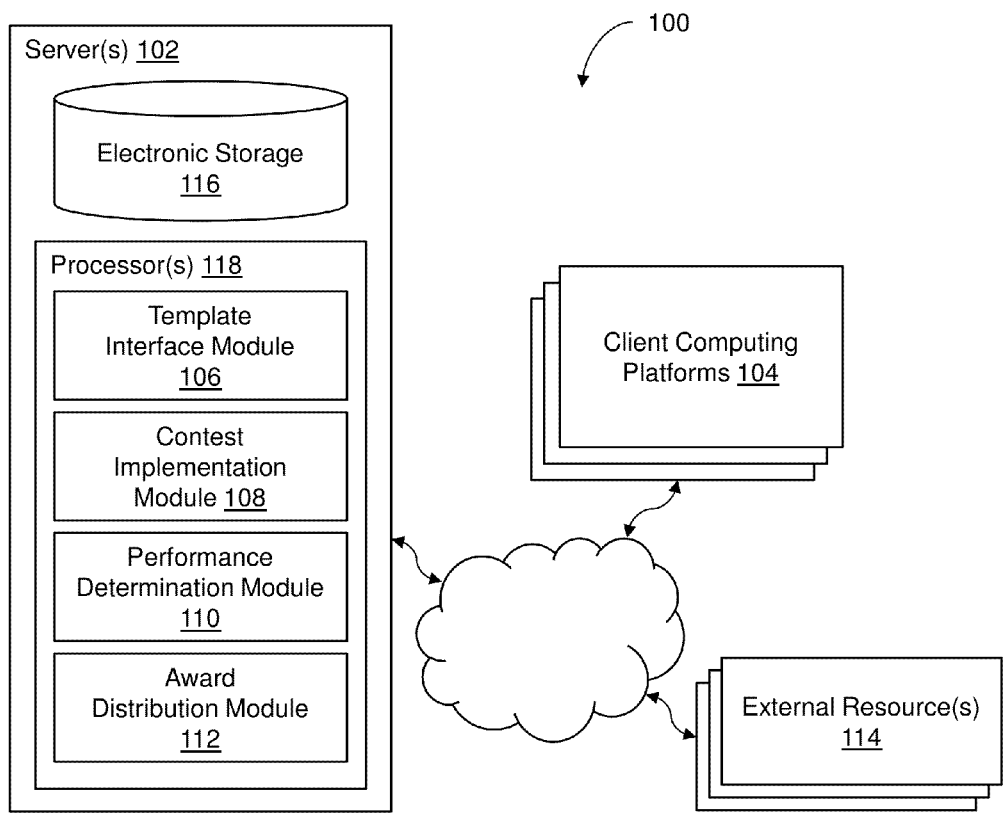
FIG. 1 illustrates a system configured to facilitate interface-based game-space contest generation, in accordance with one or more implementations.

FIG. 1 illustrates a system 100 configured to facilitate interface-based game-space contest generation, in accordance with one or more implementations. In exemplary implementations, user inputs that relate to a contest to be provided in a game space may be received via a user interface. The user inputs may include one or more performance criteria to be associated with the contest, one or more awards to be distributed in association with the contest, one or more qualifications to participate in the contest, and/or other contest-related user inputs. A notification that relates to the contest may be provided, based on the user inputs, in the game space. Contest-related activities that are performed in the game space by the users participating in the contest may be monitored. Performance scores of the participating users may be determined based on the performance criteria and the performed activities. The awards may be automatically distributed to individual ones of the participating users in accordance with the performance scores of the individual participating users. In this way, interface-based game-space contest generation may decrease human-related errors (e.g., by providing more accurate performance scoring of performed contest-related activities, awarding the right participating users, etc.), reduce award distribution delays (e.g., by determining the award winners more quickly, distributing the awards upon such determination, etc.), and/or provide other benefits.

In some implementations, system 100 may include one or more servers 102. Server(s) 102 may be configured to communicate with one or more client computing platforms 104 according to a client/server architecture. The users may access system 100 via client computing platforms 104, for instance, to interact with one or more services.

Server(s) 102 may be configured to execute one or more computer program modules to facilitate interface-based game-space contest generation. The computer program modules may include one or more of a template interface module 106, a contest implementation module 108, a performance determination module 110, an award distribution module 112, and/or other modules. In some implementations, client computing platforms 104 may be configured to execute one or more computer program modules that are the same as or similar to the computer program modules of server(s) 102 to facilitate interface-based game-space contest generation.

Template interface module 106 may be configured to provide a user interface configured to receive user inputs that include one or more performance criteria to be associated with a contest to be provided in a game space, one or more awards to be distributed in association with the contest, one or more qualifications to participate in the contest, and/or other user inputs. Template interface module 106 may be configured to provide the user interface to an administrator to receive the user inputs from the administrator via the user interface.

Figure 2:
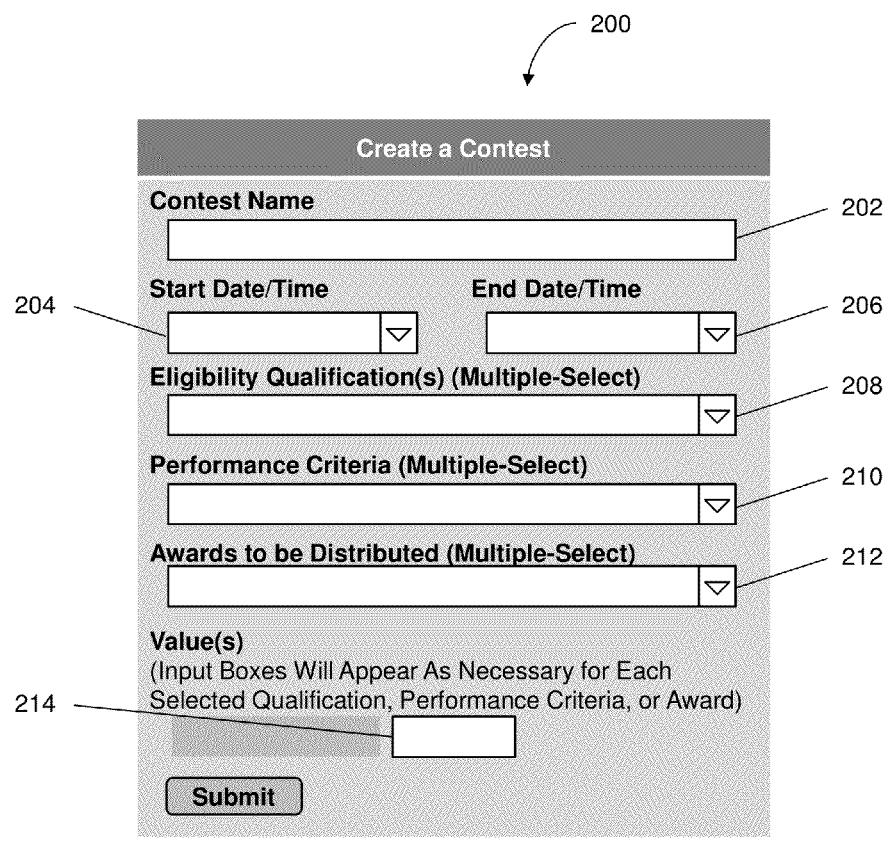
FIG. 2 illustrates a diagram of a user interface for receiving user inputs relating to a contest, in accordance with one or more implementations.

Along these lines, FIG. 2 illustrates a diagram of a user interface 200 for receiving user inputs relating to a contest, in accordance with one or more implementations. As shown, user interface 200 enables an administrator to create a contest by entering a contest name, start/end dates and times, eligibility qualifications to be a participating user, performance criteria that can be used to assess success with respect to the contest, awards to be distribution in association with the contest, values that may be associated with selected qualifications, performance criteria, or awards, and/or other contest-related user inputs. These user inputs may, for instance, be provided by the administrator via input fields 202, 204, 206, 208, 210, 212, and 214. In one use case, the administrator may select multiple performance criteria from the drop-drop menu of input field 210. One or more corresponding input fields 214 may appear in response to the multiple selections to enable the administrator to enter, if necessary, values associated with one or more of the multiple selections (e.g., to indicate an contest activity that a performance criteria is associated with, to indicate a threshold for the performance criteria, etc.). Upon entering the user inputs, the administrator may activate the "Submit" button to initiate creation of the contest, to be provided with further options (e.g., selecting activities for the contest, saving of the contest as a template that includes the user inputs, etc.). As used herein, an administrator may include a user that has access rights to create, modify, activate, deactivate, or remove contests.

As such, in certain implementations, the performance criteria may relate to success with respect to the contest to be provided in the game space. The success-related performance criteria may relate to one or more of resource collection, building possession, combat (e.g., between user characters and/or non-user characters), rescues (e.g., of user characters and/or non-user characters), level progress, and/or other game-space features. For example, with respect to FIG. 2, the performance criteria that can be selected via input field 210 may include criteria to assess whether a participating user will be distributed a contest award (e.g., when assessed individually, when compared with other participating users, etc.). These criteria may, for instance, relate to an amount of, specific types, or particular ones of: (1) resources that the participating user may be required to collect; (2) buildings that the participating user needs to conquer or possess; (3) combats or rescues that the participating user needs to attempt, win, or complete; and/or (4) progress with respect to levels that the participating user needs to achieve (e.g., user level, building level, research level, etc.). As another example, other such criteria may relate to an amount of, specific types, or particular ones of: (1) sales that the participating user needs to make; (2) purchases that the participating user needs to make; (3) items that the participating user needs to collect or use; (4) currency that the participating user needs to purchase or spend; (5) length of gameplay that the participating user needs to achieve; (6) characters with which the participating user needs to interact; (7) alliances that the participating user needs to join; (8) logins that the participating user needs to initiate; or (8) other objectives to achieve.

In some implementations, the qualifications to participate in the contest may include merit-based qualifications associated with the game space. The merit-based qualifications may relate to one or more of possessed structures, collected resources, combat history, rescue history, user level, and/or other game-space features. For example, with respect to FIG. 2, the qualifications that can be selected via input field 208 may include qualifications relating to user achievements in the game space. A user may, for instance, be qualified to participate in a contest by achieving certain goals before a qualification deadline, such as: (1) collecting an amount of, a specific type of, or a particular resource(s); (2) conquering or possessing an amount of, a specific type of, or a particular building(s); (3) winning or completing an amount of, a specific type of, or a particular combat(s) or rescue(s); and/or (4) reaching a certain level in the game space (e.g., user level, building level, research level, etc.). As another example, other qualifications may relate to an amount of, specific types, or particular ones of: (1) sales that a user needs to make; (2) purchases that the user needs to make; (3) items that the user needs to collect or use; (4) length of gameplay of the user; (5) characters with which the user needs to interact; (6) currency that the user needs to purchase or spend; (6) alliances that the user needs to join; (7) logins that the user needs to initiate; or (8) other achievements.

In various implementations, the qualifications to participate in the contest may include non-merit-based qualifications. The non-merit-based qualifications may include contest participation fees, user age requirements, server requirements (e.g., a contest may be limited to users with accounts hosted on particular servers), location requirements (e.g., the contest may be limited to users with characters in particular areas of the game space, users located in particular areas of the real world, etc.), or other non-merit-based qualifications.

In some implementations, the game space may be a virtual space. An instance of the game space may be an instance of the virtual space. A space module may be configured to implement the instance of the virtual space executed by the computer modules. The instance of the virtual space may reflect the state of the virtual space. The instance of the virtual space may be used to push state information to clients for implementation on the clients, may be used to verify state information generated on clients executing expressions of the instance locally, and/or for other purposes. State information may include information about the state of the virtual space such as, without limitation, position information of one or more objects, topography information, object status/shape information, battle information, score information, user or character progress information, user inventory information, progress information for one or more activities or actions, view information describing a view of the virtual space, and/or other information that describes the state of the virtual space. Expressions of the instance executed on the clients facilitate presentation of views on the clients of the virtual space. Expressions of the instance executed on the clients may be configured to simply present views of the virtual space based on the state information (e.g., via streaming view information, object/position information, and/or other state information) received from the space module. Expressions of the instance executed on the clients may include space logic that effectively provides for execution of a limited version of the instance on a client that is synchronized and/or verified with state information received from the space module. The view presented on a given client may correspond to a location in the virtual space (e.g., the location from which the view is taken, the location the view depicts, and/or other locations), a zoom ratio, a dimensionality of objects, a point-of-view, and/or view parameters. One or more of the view parameters may be selectable by the user.

The instance of the virtual space may comprise a simulated space that is accessible by users via clients (e.g., client computing platforms 104) that present the views of the virtual space to a user. The simulated space may have a topography, express ongoing real-time interaction by one or more users, and/or include one or more objects positioned within the topography that are capable of locomotion within the topography. In some instances, the topography may be a 2-dimensional topography. In other instances, the topography may be a 3-dimensional topography. The topography may include dimensions of the space, and/or surface features of a surface or objects that are "native" to the space. In some instances, the topography may describe a surface (e.g., a ground surface) that runs through at least a substantial portion of the space. In some instances, the topography may describe a volume with one or more bodies positioned therein (e.g., a simulation of gravity-deprived space with one or more celestial bodies positioned therein). The instance executed by the computer modules may be synchronous, asynchronous, and/or semi-synchronous.

The above description of the views of the virtual space determined from the instance executed by the space module is not intended to be limiting. The virtual space may be presented in a more limited, or more rich, manner. For example, views of the virtual space may be selected from a limited set of graphics depicting an event in a given place within the virtual space. The views may include additional content (e.g., text, audio, pre-stored video content, and/or other content) that describes particulars of the current state of the place, beyond the relatively generic graphics. For example, a view may include a generic battle graphic with a textual description of the opponents to be confronted. Other representations of individual places within the virtual space are contemplated.

Within the instance of the virtual space executed by the space module, users may control characters, objects, simulated physical phenomena (e.g., wind, rain, earthquakes, and/or other phenomena), and/or other elements within the virtual space to interact with the virtual space and/or each other. The user characters may include avatars. As used herein, the term "user character" may refer to an object (or group of objects) present in the virtual space that represents an individual user. The user character may be controlled by the user with which it is associated. The user controlled element(s) may move through and interact with the virtual space (e.g., non-user characters in the virtual space, other objects in the virtual space). The user controlled elements controlled by and/or associated with a given user may be created and/or customized by the given user. The user may have an "inventory" of virtual goods and/or currency that the user can use (e.g., by manipulation of a user character or other user controlled element, and/or other items) within the virtual space.

The users may participate in the instance of the virtual space by controlling one or more of the available user controlled elements in the virtual space. Control may be exercised through control inputs and/or commands input by the users through client computing platforms 104. The users may interact with each other through communications exchanged within the virtual space. Such communications may include one or more of textual chat, instant messages, private messages, voice communications, and/or other communications. Communications may be received and entered by the users via their respective client computing platforms 104. Communications may be routed to and from the appropriate users through server(s) 102 (e.g., through a space module).

Contest implementation module 108 may be configured to provide, based on the user inputs, a notification in the game space that relates to the contest. For example, the notification may be provided based on the performance criteria to be associated with the contest, the awards to be distributed in association with the content, and/or the qualifications to participate in the contest that are received as one or more of the user inputs. In various implementations, for instance, the notification may indicate one or more of the users that are qualified to enter the contest based on the qualifications to participate in the contest. In some implementations, the notification may indicate the performance criteria, the awards, and/or the qualifications. In this way, users of the game space may be informed of the contest, be incentivized to participate in the contest (e.g., in response to the notification of the awards), become more engaged in the game space (e.g., to become qualified to participate in the contest before a qualification deadline), and/or provide other benefits.

Figure 3:
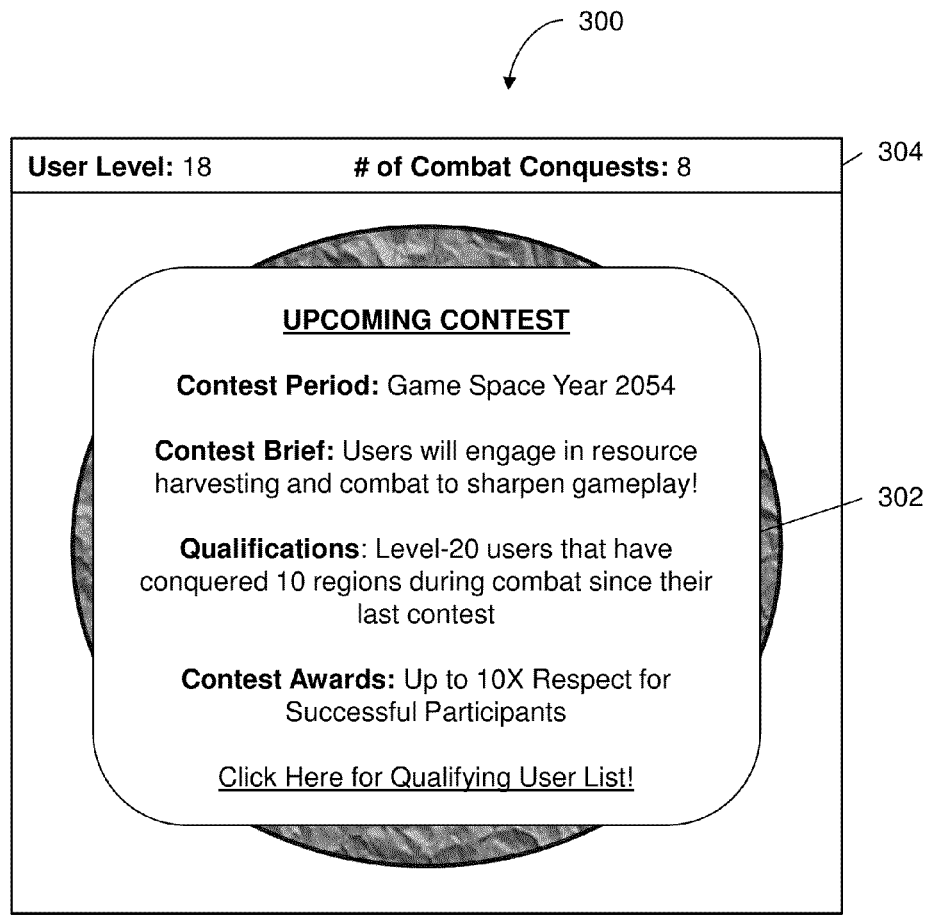
FIG. 3 illustrates a diagram of a user interface depicting a notification relating to a contest, in accordance with one or more implementations.

By way of example, FIG. 3 illustrates a diagram of a user interface 300 depicting a notification 302 relating to a contest, in accordance with one or more implementations. As shown, user interface 300 includes a status bar 304 to indicate a user's level, a number of combat conquests since a previous contest, and/or other information to the user. User interface 300 may utilized to present notification 302 to inform the user of the contest period, a brief summary of the contest, qualifications to be eligible to participate in the contest, contest awards to be distributed in association with the contest, and a link to a list of qualifying users that may participate in the contest. Notification 302 may be generated based on the user inputs entered by an administrator via input fields 202, 204, 206, 208, 210, 212, and 214 of user interface 200 that is shown in FIG. 2. In one use case, the link to the list of qualifying users in notification 302 may be generated based on the qualifications selected by the administrator via input field 208 and the associated values entered in input fields 214. In another use case, notification 302 may specify the qualifying users in lieu of the link to the list, inform the user whether he/she is one of the qualifying users, and/or provide other information relating to the qualifications.

In certain implementations, contest implementation module 108 may execute the contest in the game space based on the user inputs. In one scenario, content implementation module 108 may set the contest period to be from the user-inputted start date/time until the user-inputted end date/time. As an example, activities of the contest may be made available to the participating users during the contest period. As another example, activities of the contest may be activities that can be performed by users (without regard to the contest) in the game space but those activities may be monitored for the participating users in association with the contest during the contest period to determine performance scores of the participating users that perform the activities. Contest-related activities may include collecting resources, constructing or otherwise obtaining buildings, engaging in combat, performing rescues, selling merchandise, collecting items, and/or other activities. In another scenario, user-inputted awards may be distributed to the participating users throughout the duration of the contest period, at the end of the contest period, or at other times in accordance with the determined performance scores of the participating users.

As such, performance determination module 110 may be configured to determine, based on the performance criteria and activities that are performed in the game space by the users that participated in the contest, performance scores of the participating users. Award distribution module 112 may be configured to facilitate automated distribution of the awards to individual ones of the participating users in accordance with the performance scores of the individual participating users. For example, in one use case, the activity may be collecting a specific type of resource (e.g., diamond, gold, silver, platinum, iron, wheat, etc.) and the performance criteria may include having the most amounts of the specific type of resource collected during the contest period. As such, participating users that have collected more of the specific type of the resource than other participating users during the contest period may be assigned higher performance score than those other participating users. Thus, awards may be automatically distributed to a certain number of the participating users that collect the most amounts of the specific type of resource during the contest period (e.g., at the end of the contest period, at one or more intervals during the contest period, etc.). The awards may include virtual items, virtual currency, buildings, resources, access to other contests, access to regions in the game space, access to activities in the game space, respect, multipliers (e.g., 10× respect), level increase, and/or other awards.

In various implementations, award distribution module 112 may be configured such that at least one of the awards is distributed to at least one of the participating users in response to the performance scores of the at least one participating user satisfying one or more performance thresholds. By way of example, a particular contest in the game space may provide awards to participating users that satisfy a certain performance threshold. In one use case, the particular contest may be configured such that a participating user may be provided with an award associated with the contest if the participating user harvests a specific predetermined amount of resources during the contest period (e.g., harvesting 5000 units of wood, harvesting 2000 units of wheat, etc.). The participating user may, for instance, be provided with the award during or after the contest period in response to determining that the participating user satisfied the specific resource harvesting threshold during the contest period.

In another use case, the participating user may be provided with multiple awards for satisfying multiple performance thresholds. For example, the participating user may be provided with one award after the participating user harvests a first amount of resources (e.g., 5000 units of wood) during the contest period, and a different award after the participating user harvests a second amount of resources (e.g., 12,000 units of wood). In this way, users may be provided with a plurality of incentives to sign up, participate, and/or continue to participate in the game-space contest. The awards may, for instance, be automatically distributed to the participating user in real-time as soon as the participating user completes each set of activities to satisfy the performance thresholds. As such, wait time associated with distribution of the awards may be eliminated or otherwise reduced.

In certain implementations, award distribution module 112 may be configured such that the awards are distributed based on one or more predetermined intervals of the contest. By way of example, a particular contest may last for a period of one week, each day of the contest may represent one time interval of the contest, and award distribution module 112 may be configured to distribute the awards at the end of each day to individual participating users that are determined to have satisfied one or more performance thresholds.

In some implementations, award distribution module 112 may be configured such that a first award of the awards is distributed during a first predetermined interval of the predetermined intervals to a first participating user of the participating users in response to the performance scores of the first participating user satisfying a first performance threshold during the first predetermined interval, and such that a second award of the awards is distributed during a second predetermined interval of the predetermined intervals to the first participating user in response to the performance scores of the first participating user satisfying a second performance threshold during the second predetermined interval.

In one scenario, a particular contest in the game space may last for a period of one week, and each day of the contest may represent one time interval of the contest. The contest may provide awards to participating users for each day that the participating users perform activities that satisfy a performance threshold. For example, a participating user may be provided with 1000 units of wood when the participating user logs into the game space on the first day of the contest (e.g., logging into the game space may be a predefined activity for satisfying a performance threshold). The participating user may be provided with 1500 units of iron when the participating user logs into the game space on the second day of the contest. The participating user may be provided with 2000 units of wheat when the participating user logs into the game space on the third day of the contest, and so on. In this way, among other benefits, contests may enable participating users to develop habits based on the predefined activities (e.g., logging in on a regular basis), encourage a steady stream of activities by participating users, etc.

In various implementations, template interface module 106 may be configured to store a template that indicates the user inputs. As such, in some implementations, the contest may be executed in the game space based on the stored template. The contest may, for instance, be executed based on a predetermined schedule, a periodic basis, a manual user activation, and/or other trigger using the user inputs indicated in the stored template. In one scenario, a game-space contest created via interface-based game-space contest generation that attracted a substantial number of participating users may be reinitiated so that the contest may be repeated in accordance with a predetermined schedule or via a manual user activation of the contest by using the template to provide the user inputs for the contest.

Server(s) 102, client computing platforms 104, external resources 114, and/or other components may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which server(s) 102, client computing platforms 104, external resources 114, and/or other components may be operatively linked via some other communication media.

A given client computing platform 104 may include one or more processors configured to execute computer program modules. The computer program modules may be configured to enable an expert or user associated with client computing platform 104 to interface with system 100 and/or external resources 114, and/or provide other functionality attributed herein to client computing platforms 104. By way of non-limiting example, client computing platform 104 may include one or more of a desktop computer, a laptop computer, a handheld computer, a netbook, a smartphone, a gaming console, and/or other computing platforms.

External resources 114 may include sources of information, hosts and/or providers of virtual spaces outside of system 100, external entities participating with system 100, and/or other resources. In some implementations, some or all of the functionality attributed herein to external resources 114 may be provided by resources included in system 100.

In some implementations, server(s) 102 may include an electronic storage 116, one or more processor(s) 118, and/or other components. Server(s) 102 may include communication lines, or ports to enable the exchange of information with a network and/or other computing platforms. Illustration of server(s) 102 in FIG. 1 is not intended to be limiting. Server(s) 102 may include a plurality of hardware, software, and/or firmware components operating together to provide the functionality attributed herein to server(s) 102. For example, server(s) 102 may be implemented by a cloud of computing platforms operating together as server(s) 102.

Electronic storage 116 may include electronic storage media that electronically stores information. In some implementations, the electronic storage media of electronic storage 116 may include one or both of system storage that is provided integrally (i.e., substantially non-removable) with server(s) 102 and/or removable storage that is removably connectable to server(s) 102 via, for example, a port (e.g., a USB port, a firewire port, etc.) or a drive (e.g., a disk drive, etc.). Electronic storage 116 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 116 may include one or more virtual storage resources (e.g., cloud storage, a virtual private network, and/or other virtual storage resources). Electronic storage 116 may store software algorithms, information determined by processor(s) 118, information received from server(s) 102, information received from client computing platforms 104, and/or other information that enables server(s) 102 and/or client computing platforms 104 to function as described herein. It should be noted that, in certain implementations, electronic storage 116 may be a part of server(s) 102, a part of a given client computing platform 104, and/or a separate component of system 100.

In some implementations, processor(s) 118 is configured to provide information processing capabilities in server(s) 102. As such, processor(s) 118 may include one or more of a digital processor, an analog processor, a digital circuit designed to process information, an analog circuit designed to process information, a state machine, and/or other mechanisms for electronically processing information. Although processor(s) 118 is shown in FIG. 1 as a single entity, this is for illustrative purposes only. In some implementations, processor(s) 118 may include a plurality of processing units.

These processing units may be physically located within the same device, or processor(s) 118 may represent processing functionality of a plurality of devices operating in coordination. Processor(s) 118 may be configured to execute modules 106, 108, 110, 112, and/or other modules. Processor(s) 118 may be configured to execute modules 106, 108, 110, 112, and/or other modules by software; hardware; firmware; some combination of software, hardware, and/or firmware; and/or other mechanisms for configuring processing capabilities on processor(s) 118. As noted, in certain implementations, a given client computing platform 104 may include one or more computer program modules that is the same as or similar to the computer program modules of server(s) 102. Client computing platform 104 may include one or more processors that are the same or similar to processor(s) 118 of server(s) 102 to execute such computer program modules of client computing platform 104.

It should be appreciated that although modules 106, 108, 110, and 112 are illustrated in FIG. 1 as being co-located within a single processing unit, in implementations in which processor(s) 118 includes multiple processing units, one or more of modules 106, 108, 110, and/or 112 may be located remotely from the other modules. The description of the functionality provided by the different modules 106, 108, 110, and/or 112 described below is for illustrative purposes, and is not intended to be limiting, as any of modules 106, 108, 110, and/or 112 may provide more or less functionality than is described. For example, one or more of modules 106, 108, 110, and/or 112 may be eliminated, and some or all of its functionality may be provided by other ones of modules 106, 108, 110, and/or 112. As another example, processor(s) 118 may be configured to execute one or more additional modules that may perform some or all of the functionality attributed below to one of modules 106, 108, 110, and/or 112.

Figure 4:
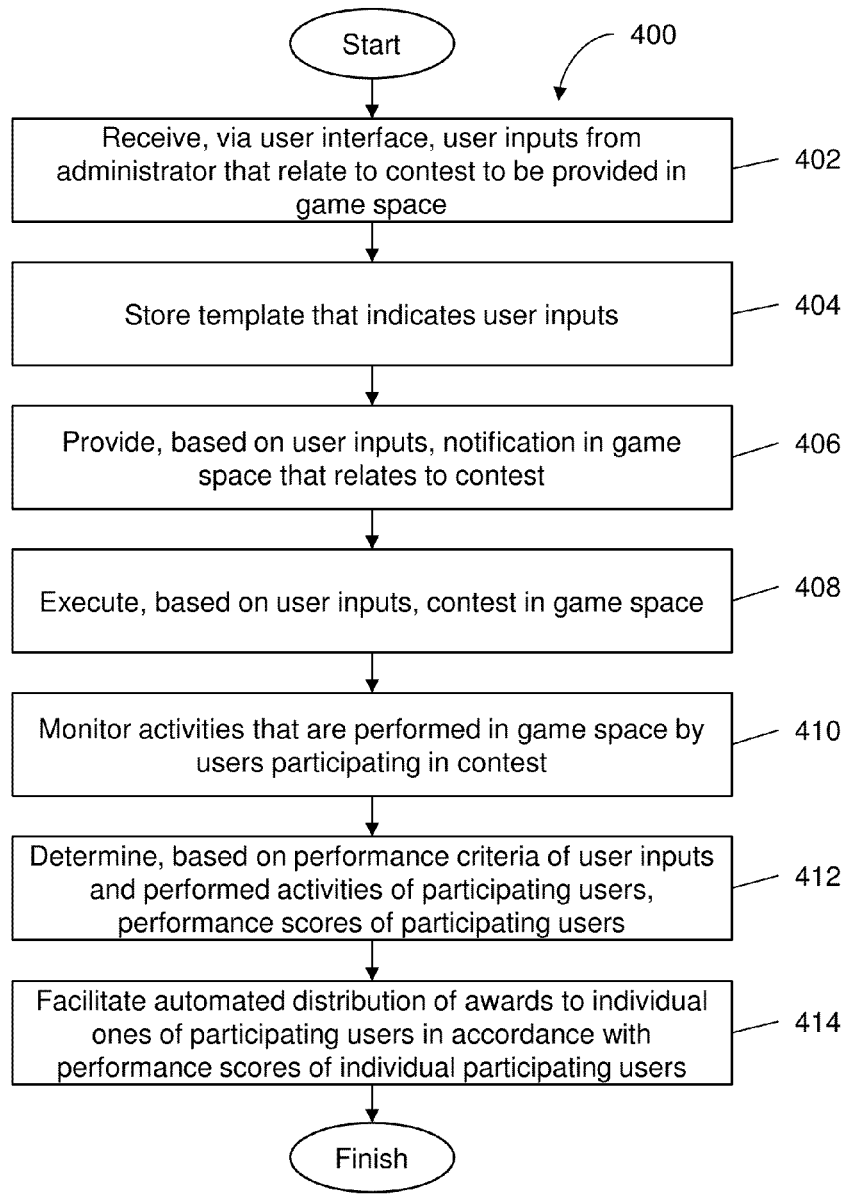
FIG. 4 illustrates a method for facilitating interface-based game-space contest generation, in accordance with one or more implementations.

FIG. 4 illustrates a method for facilitating interface-based game-space contest generation, in accordance with one or more implementations. The operations of method 400 presented below are intended to be illustrative. In some implementations, method 400 may be accomplished with one or more additional operations not described, and/or without one or more of the operations discussed. Additionally, the order in which the operations of method 400 are illustrated in FIG. 4 and described below is not intended to be limiting.

In some implementations, method 400 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 400 in response to instructions stored electronically on an electronic storage medium. The one or more processing devices may include one or more devices configured through hardware, firmware, and/or software to be specifically designed for execution of one or more of the operations of method 400.

At an operation 402, user inputs that relate to a contest to be provided in a game space may be received from an administrator via a user interface. The user inputs may include one or more performance criteria to be associated with the contest, one or more awards to be distributed in association with the contest, one or more qualifications to participate in the contest, and/or other user inputs. The game space may be configured to facilitate interaction of users with the game space and/or each other by performing operations in the game space in response to commands received from the users. In certain implementations, the performance criteria may relate to success with respect to the contest. The success-related performance criteria may relate to one or more of resource collection, building possession, combat, rescues, or level progress. In some implementations, the qualifications include merit-based qualifications associated with the game space. The merit-based qualifications may relate to one or more of possessed structures, collected resources, combat history, rescue history, or user level. Operation 402 may be performed by a template interface module that is the same as or similar to template interface module 106, in accordance with one or more implementations.

At an operation 404, a template that indicates the user inputs may be stored. As such, in some implementations, the contest may be executed in the game space based on the stored template. The contest may, for instance, be executed based on a predetermined schedule, a periodic basis, a manual user activation, and/or other trigger using the user inputs indicated in the stored template. Operation 404 may be performed by a template interface module that is the same as or similar to template interface module 106, in accordance with one or more implementations.

At an operation 406, a notification that relates to the contest may be provided in the game space based on the user inputs. For example, the notification may be provided based on the performance criteria, the awards, and/or the qualifications that are received as user inputs from the administrator via the user interface. In some implementations, the notification may indicate one or more of the users that are qualified to enter the contest. Operation 406 may be performed by a contest implementation module that is the same as or similar to contest implementation module 108, in accordance with one or more implementations.

At an operation 408, the contest may be executed in the game space based on the user inputs. For example, the contest may be executed based on the performance criteria, the awards, and/or the qualifications that are received as user inputs from the administrator via the user interface. Operation 408 may be performed by a contest implementation module that is the same as or similar to contest implementation module 108, in accordance with one or more implementations.

At an operation 410, activities that are performed in the game space by the users participating in the contest may be monitored. Operation 410 may be performed by a performance determination module that is the same as or similar to performance determination module 110, in accordance with one or more implementations.

At an operation 412, performance scores of the participating users may be determined based on the performance criteria and the performed activities of the participating users. Operation 412 may be performed by a performance determination module that is the same as or similar to performance determination module 110, in accordance with one or more implementations.

At an operation 414, automated distribution of the awards to individual ones of the participating users may be facilitated in accordance with the performance scores of the individual participating users. Operation 414 may be performed by an award distribution module that is the same as or similar to award distribution module 112, in accordance with one or more implementations.

In certain implementations, with respect to operation 414, the automated distribution may be facilitated such that the awards are distributed to the individual participating users based on one or more predetermined intervals of the contest. In some implementations, the automated distribution may be facilitated such that a first award of the awards is distributed during a first predetermined interval of the predetermined intervals to a first participating user of the participating users in response to the performance scores of the first participating user satisfying a first performance threshold during the first predetermined interval, and such that a second award of the awards is distributed during a second predetermined interval of the predetermined intervals to the first participating user in response to the performance scores of the first participating user satisfying a second performance threshold during the second predetermined interval.

Although the present invention has been described in detail for the purpose of illustration based on what is currently considered to be the most practical and preferred implementations, it is to be understood that such detail is solely for that purpose and that the invention is not limited to the disclosed implementations, but, on the contrary, is intended to cover modifications and equivalent arrangements that are within the spirit and scope of the appended claims. For example, it is to be understood that the present invention contemplates that, to the extent possible, one or more features of any implementation can be combined with one or more features of any other implementation.

What is claimed is:

1. A system for facilitating interface-based game-space contest generation, the system comprising:
   one or more processors configured to execute computer program modules, the computer program modules comprising:
      a template interface module configured to provide a user interface for presentation to an administrator, wherein the user interface is configured to receive user inputs from the administrator that include one or more performance criteria to be associated with a contest to be provided in a realm-building game space, one or more awards to be distributed in association with the contest, wherein the one or more awards include virtual items usable in the game space, and one or more qualifications to participate in the contest, and wherein the realm-building game space is configured to facilitate interaction of users with the realm-building game space and/or each other by performing operations in the game space to achieve one or more realm-building game objectives in response to commands received from the users;
      a contest implementation module configured to provide, based on the user inputs, a notification in the game space that relates to the contest;
      a performance determination module configured to determine, based on the performance criteria and activities that are performed in the realm-building game space by the users that participated in the contest, performance scores of the participating users, wherein the performance criteria and activities that are performed in the realm-building game space, that contribute to the determination of the performance scores of the participating users in the contest, are the same performance criteria and activities performed by the users when performing operations in the game space to achieve one or more realm-building game objectives; and
      an award distribution module configured to automatically distribute the virtual items usable in the game space to individual ones of the participating users in accordance with the performance scores of the individual participating users.

2. The system of claim 1, wherein the performance criteria relate to success with respect to the contest.

3. The system of claim 2, wherein the success-related performance criteria relate to one or more of resource collection, building possession, combat, rescues, or level progress.

4. The system of claim 1, wherein the qualifications include merit-based qualifications associated with the game space earned separately from the contest and prior to the contest period.

5. The system of claim 4, wherein the merit-based qualifications relate to one or more of possessed buildings, collected resources, combat history, rescue history, or levels associated with the game space.

6. The system of claim 1, wherein the contest implementation module is configured such that the notification indicates one or more of the users that are qualified to participate in the contest based on the qualifications.

7. The system of claim 1, wherein the template interface module is configured to store a template that indicates the user inputs, and wherein the contest implementation module is configured to execute the contest in the game space based on the stored template.

8. The system of claim 1, wherein the award distribution module is configured such that at least one of the awards is distributed to at least one of the participating users in response to the performance scores of the at least one participating user satisfying one or more performance thresholds.

9. The system of claim 1, wherein the award distribution module is configured such that the awards are distributed to the individual participating users based on one or more predetermined intervals of the contest.

10. The system of claim 9, wherein the award distribution module is configured such that a first award of the awards is distributed during a first predetermined interval of the predetermined intervals to a first participating user of the participating users in response to the performance scores of the first participating user satisfying a first performance threshold during the first predetermined interval, and such that a second award of the awards is distributed during a second predetermined interval of the predetermined intervals to the first participating user in response to the performance scores of the first participating user satisfying a second performance threshold during the second predetermined interval.

11. A computer-implemented method of facilitating interface-based game-space contest generation, the method being implemented on a computer system that includes one or more physical processors, the method comprising:
   Providing a user interface for presentation to an administrator, wherein the user interface is configured to receive user inputs from the administrator that include one or more performance criteria to be associated with a contest to be provided in a realm-building game space executed on a server, one or more awards to be distributed in association with the contest, wherein the one or more awards include virtual items usable in the realm-building game space, and one or more qualifications to participate in the contest, and wherein the realm-building game space is configured to facilitate interaction of users with the realm-building game space and/or each other by performing operations in the realm-building game space to achieve one or more realm-building game objectives in response to commands received from the users;
   providing, based on the user inputs, a notification in the game space, executed on one or more client computing platforms, that relates to the contest;
   determining, based on the performance criteria and activities that are performed in the realm-building game space by the users that participated in the contest, performance scores of the participating users, wherein the performance criteria and activities that are performed in the realm-building game space, that contribute to the determination of the performance scores of the participating users in the contest, are the same performance criteria and activities performed by the users when performing operations in the game space to achieve one or more realm-building game objectives; and automatically distributing the virtual items usable in the game space to individual ones of the participating users in accordance with the performance scores of the individual participating users.

12. The method of claim 11, wherein the performance criteria relate to success with respect to the contest.

13. The method of claim 12, wherein the success-related performance criteria relate to one or more of resource collection, building possession, combat, rescues, or level progress.

14. The method of claim 11, wherein the qualifications include merit-based qualifications associated with the game space earned separately from the contest and prior to the contest period.

15. The method of claim 14, wherein the merit-based qualifications relate to one or more of possessed buildings, collected resources, combat history, rescue history, or levels associated with the game space.

16. The method of claim 11, wherein the notification indicates one or more of the users that are qualified to participate in the contest based on the qualifications.

17. The method of claim 11, further comprising:
storing a template that indicates the user inputs; and
executing the contest in the game space based on the stored template.

18. The method of claim 11, further comprising automatically distributing at least one of the awards to at least one of the participating users in response to the performance scores of the at least one participating user satisfying one or more performance thresholds.

19. The method of claim 11, further comprising, based on one or more predetermined intervals of the contest, automatically distributing the awards to the individual participating users.

20. The method of claim 19, further comprising:
automatically distributing a first award of the awards during a first predetermined interval of the predetermined intervals to a first participating user of the participating users in response to the performance scores of the first participating user satisfying a first performance threshold during the first predetermined interval; and
automatically distributing a second award of the awards during a second predetermined interval of the predetermined intervals to the first participating user in response to the performance scores of the first participating user satisfying a second performance threshold during the second predetermined interval.

* * * * *